United States Patent
Miyamoto et al.

(10) Patent No.: US 8,280,071 B2
(45) Date of Patent: Oct. 2, 2012

(54) VOICE OUTPUT SYSTEM AND METHOD

(75) Inventors: Naokazu Miyamoto, Kanagawa (JP); Osamu Takahashi, Chiba (JP); Yutaka Sato, Kanagawa (JP)

(73) Assignee: Sony Corporation (JP)

( * ) Notice: Subject to any disclaimer, the term of this patent is extended or adjusted under 35 U.S.C. 154(b) by 1358 days.

(21) Appl. No.: 11/259,404

(22) Filed: Oct. 26, 2005

(65) Prior Publication Data

US 2006/0103722 A1    May 18, 2006

(30) Foreign Application Priority Data

Oct. 28, 2004    (JP) ................. P2004-314072

(51) Int. Cl.
*H04B 5/00* (2006.01)

(52) U.S. Cl. ............ 381/79; 381/77; 381/300; 381/306; 381/307

(58) Field of Classification Search .......... 381/300, 381/306–307, 2, 77–82
See application file for complete search history.

(56) References Cited

U.S. PATENT DOCUMENTS

| | | | | |
|---|---|---|---|---|
| 2004/0223622 A1* | 11/2004 | Lindemann et al. | ............ | 381/79 |
| 2004/0234081 A1* | 11/2004 | Brice et al. | ............ | 381/86 |
| 2004/0247139 A1* | 12/2004 | Wang | ............ | 381/74 |
| 2004/0258247 A1* | 12/2004 | Shigaki | ............ | 381/17 |
| 2004/0258259 A1* | 12/2004 | Koyama | ............ | 381/307 |
| 2005/0195986 A1* | 9/2005 | McCarty et al. | ............ | 381/79 |
| 2005/0261789 A1* | 11/2005 | Chen | ............ | 700/94 |
| 2006/0222191 A1* | 10/2006 | Hung et al. | ............ | 381/307 |
| 2008/0247554 A1* | 10/2008 | Caffrey | ............ | 381/18 |

FOREIGN PATENT DOCUMENTS

| | | |
|---|---|---|
| JP | 2-292920 A | 12/1990 |
| JP | 3072057 A | 3/1991 |
| JP | 5-344098 A | 12/1993 |
| JP | 6-120903 A | 4/1994 |
| JP | 2001-275194 A | 10/2001 |
| JP | 2002-232375 A | 8/2002 |
| JP | 2003-188819 A | 7/2003 |
| JP | 2004-120407 A | 4/2004 |

OTHER PUBLICATIONS

"International Standard", Nov. 2003, international electronic commission, first edition.*

* cited by examiner

*Primary Examiner* — Disler Paul
(74) *Attorney, Agent, or Firm* — Lerner, David, Littenberg, Krumholz & Mentlik, LLP (57) ABSTRACT

A voice output system and method provide a voice of high quality while enabling coexistence with other wireless transmission systems. Compression-encoded voice data accompanying a video displayed on a video display surface is acquired at the side opposed to the video display surface. The voice data is wirelessly transmitted. At least at the video display surface side, the wirelessly transmitted voice data transmitted is received and expanded. Then, the voice based on the acquired expanded voice data is output.

14 Claims, 6 Drawing Sheets

VOICE OUTPUT SYSTEM AND METHOD

CROSS-REFERENCE TO RELATED APPLICATIONS

The present application claims priority from Japanese Patent Application No. JP 2004-314072 filed on Oct. 28, 2004, the disclosure of which is hereby incorporated by reference herein.

BACKGROUND OF THE INVENTION

The present invention relates to a voice output system and method, which is suitably applied, for example, to a home theater system.

Heretofore, in an Audio Video (AV) system, such as, for example, a home theater system, etc., a speaker is necessary to be connected to a device which acquires and outputs voice data of a tuner for television broadcasting, a Digital Versatile Disc (DVD) reproducer, etc.

In this case, for example, in the DVD standards, a 5.1 channel is defined as an audio channel. Further, as speakers, a total of six speakers or at least three front speakers, two rear speakers and one subwoofer are used. Thus, at least six speaker cables are needed to be wired. Such a wiring work is complicated. Also, many cables are drawn around from the reproducer and amplifiers, disfiguring the appearance after installation.

Figure 1:
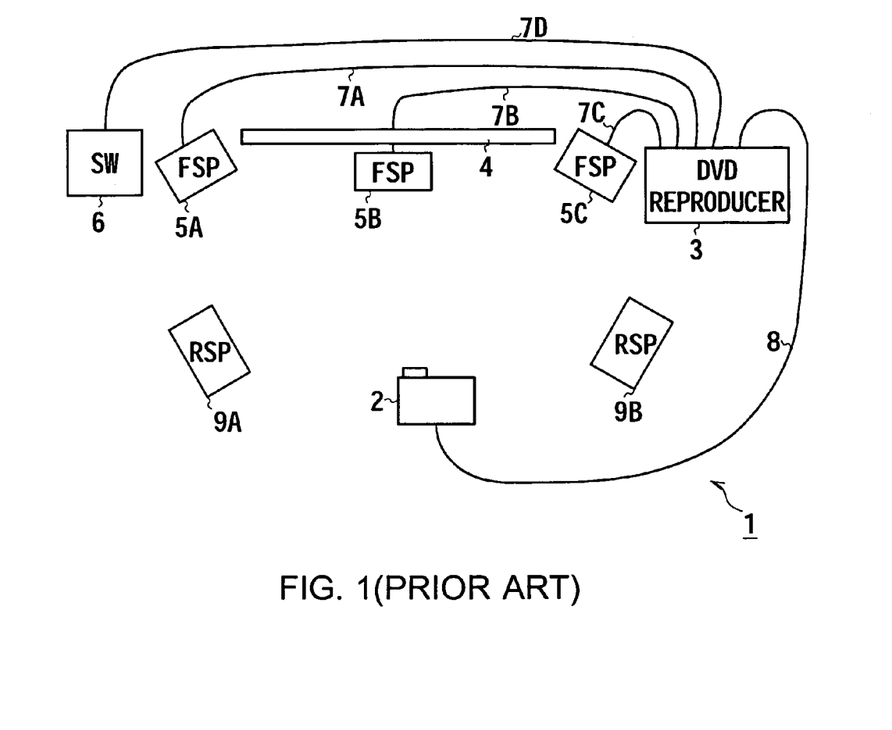
FIG. 1 is a schematic view showing a configuration example of a home theater system in related art.

To solve the problems above, a technique is proposed and practically used, for example, as shown in FIG. 1, in a home theater 1 using a projector 2 as a video appliance, a DVD reproducer 3 is installed at a screen 4 side (hereinafter referred to as a "front side"). A voice signal and a video signal are transmitted to three front speakers 5A to 5C and a subwoofer 6 disposed at the front side and the projector 2 disposed at the side opposed to the video display surface of the screen 4 (hereinafter referred to as a "rear side"), from the DVD reproducer 3 through speaker cables 7A to 7D and a video cable 8. On the other hand, a voice signal is wirelessly transmitted by using an infrared ray and a radio wave to two rear speakers 9A and 9B arranged at the rear side.

However, with this technique, the DVD reproducer 3 is presupposed to be set at the front side. Therefore, there arises a necessity of drawing the video cable 8 for connecting between the DVD reproducer 3 and the projector 2 from the front side to the rear side. As a result, not only an appearance after the installation is disfigured, but also a video signal transmitted through the video cable 8 drawn from the front side to the rear side is deteriorated. Further, there also arises a problem that the quality of the display video is deteriorated.

Therefore, recently, a technique is proposed in which the DVD reproducer is disposed at the rear side, and the DVD reproducer and the projector are connected by a video voice cable. Further, the video voice data reproduced from a DVD output from the DVD reproducer is decoded in the projector and a video based on the acquired video data is projected on a screen by the projector. Then, the voice data of each channel acquired at this time is wirelessly transmitted from the projector to the corresponding speaker by using an infrared ray (for example, refer to Jpn. Pat. Appln. Laid-Open Publication No. 2003-188819).

With this technique, the wiring of the speaker cable from the DVD reproducer to each speaker can be made unnecessary. Further, the disfigurement of the appearance after the installation and the possibility of the deterioration of the quality of the display video can be prevented effectively.

However, with the technique above, the existing infrared wireless transmission system superposes voice data for two channels and transmits the voice data. Accordingly, the voice data for 5.1 channels (that is, 6 channels) must be divided for two channels and wirelessly transmitted. Therefore, there exist a plurality of carriers having different frequencies by superposing the different voice signals in the same space, causing a problem that the normal wireless transmission of the voice signal is difficult due to the interference of the carriers.

As the simplest technique for avoiding such interference, a technique is considered for superposing the voice data of two or more channels in the same carrier and wirelessly transmitting the voice data. However, in this system, as compared with the related technique which wirelessly transmits only the two channels, a wide bandwidth is necessary for the data transmission. As a result, there is a problem that the bandwidth overlaps with bandwidth used in other infrared wireless transmission systems, such as an infrared remote control system or the like, which adversely affect each other.

SUMMARY OF THE INVENTION

The present invention has been made in consideration of the above-mentioned points, and to propose a voice output system and method which can provide a voice of high quality while enabling coexistence with other wireless transmission systems.

To solve the problems above, the present invention provides a voice output system including transmitting means disposed at the side opposed to a video display surface for acquiring compression-encoded voice data accompanying a video displayed on the video display surface and wirelessly transmitting the voice data; and voice output means disposed at least on the video display surface for receiving and expanding the voice data wirelessly transmitted from the transmitting means and outputting the voice based on the acquired expanded voice data.

As a result, in this voice output system, the wiring of the speaker cable for transmitting the voice data between the side opposed to the video display surface and the video display surface is not required at all. Therefore, the trouble of wiring the speaker cable is avoided and the disfigurement of the appearance after the installation can be prevented beforehand. Further, since the voice data is compression-encoded and wirelessly transmitted, the band necessary for wirelessly transmitting the voice data is reduced so as to enable coexistence with other wireless transmission systems.

In the present invention, a voice output method includes acquiring compression-encoded voice data accompanying a video displayed on a video display surface at the side opposed to the video display surface, and wirelessly transmitting the voice data; and receiving and expanding the wirelessly transmitted voice data at least at the video display surface side and outputting the voice based on the acquired expanded voice data.

According to the present invention, in the voice output system and method, the compression-encoded voice data accompanying the video displayed on the video display surface is acquired at the side opposed to the video display surface. The voice data is wirelessly transmitted. At least at the video display surface side, the wirelessly transmitted voice data is received and expanded, and the voice based on the acquired expanded voice data is output. Thus, the wiring of the speaker cable for transmitting the voice data between the side opposed to the video display surface and the video display surface side is not required at all. As a result, the trouble of wiring the speaker cable is avoided and the disfigurement of the appearance after the installation can be prevented beforehand. Further, the voice data is compression-encoded and wirelessly transmitted. Therefore, the voice output system and method which can provide a voice of high quality while enabling coexistence with other wireless transmission systems are realized by reducing the band necessary to wirelessly transmit the voice data.

The nature, principle and utility of the invention will become more apparent from the following detailed description when read in conjunction with the accompanying drawings in which like parts are designated by like reference numerals or characters.

DETAILED DESCRIPTION

Preferred embodiments of this invention will be described with reference to the accompanying drawings.

(1) First Embodiment

Figure 2:
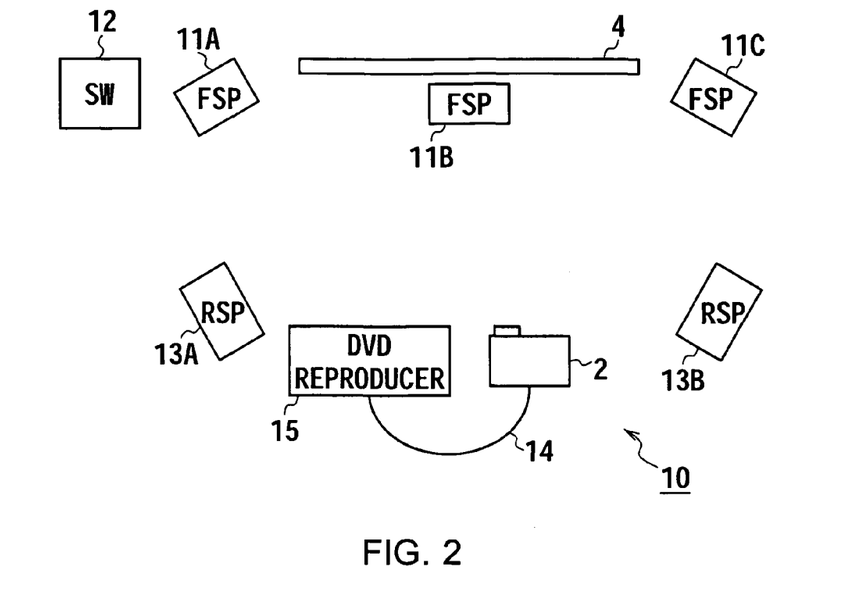
FIG. 2 is a schematic view showing a configuration of a home theater system according to a first embodiment.

In FIG. 2, in which similar reference numerals indicate like parts in FIG. 1, reference numeral 10 shows a home theater system according to a first embodiment to which the present invention is applied as a whole. The home theater system 10 includes three front speakers 11A to 11C and a subwoofer 12 installed at a screen 4 side, two rear speakers 13A, 13B and a projector 2 installed at a rear side, and a DVD reproducer 15 disposed near the projector 2 and connected to the projector 2 through a video cable 14.

Figure 3:
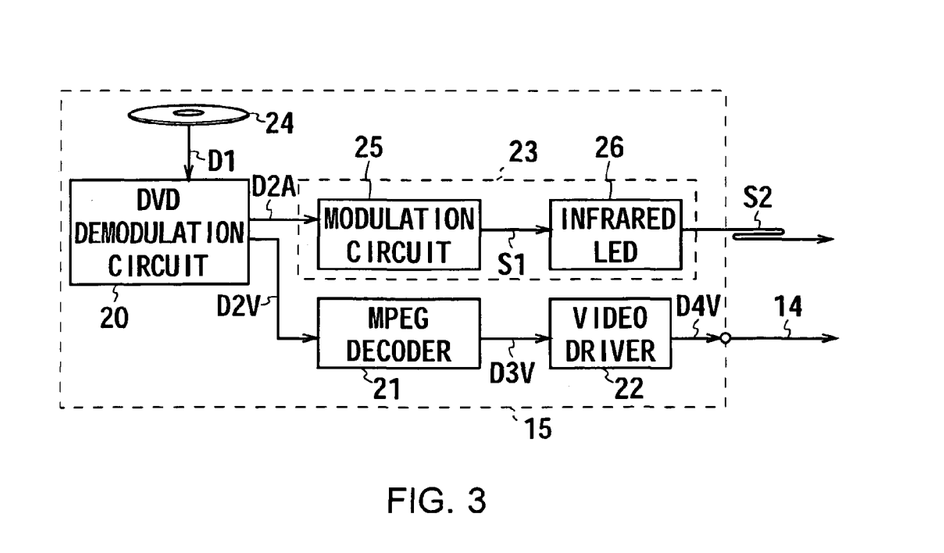
FIG. 3 is a block diagram showing a simple configuration of a DVD reproducer in the home theater system according to the first embodiment.

As shown in FIG. 3, the DVD reproducer 15 includes a DVD demodulation circuit 20, an Moving Picture coding Exerts Group (MPEG) decoder circuit 21, a video driver circuit 22 and a wireless transmission transmitting circuit 23. In the DVD reproducer 15, video voice data D1 read out from a DVD 24 by an optical pickup (not shown) is input to the DVD demodulation circuit 20.

The DVD demodulation circuit 20 performs a predetermined demodulating process including an error correcting process with respect to the supplied video voice data D1. Thus, the DVD demodulation circuit 20 extracts video data D2V and voice data D2A from the video voice data D1. The DVD demodulation circuit 20 then sends the acquired video data D2V to the MPEG decoder circuit 21, as well as sends the voice data D2A to a modulation circuit 25 of the wireless transmission transmitting circuit 23.

At this time, the video data D2V is compression-encoded by an MPEG system standardized by the DVD standards. Thus, the MPEG decoder circuit 21 performs a decoding process of an MPEG system to the supplied video data D2V and sends video data D3V of the obtained baseband to the video driver circuit 22.

The video driver circuit 22 performs a predetermined matching process for preventing a reflection, etc., caused by a resistance load of the video cable 14 to the supplied video data. Then, the video driver circuit 22 sends the acquired video data D4V to the projector 2 through the video cable 14. The projector 2 projects a video based on the supplied video data D4V toward the screen 4. Thus, the video reproduced from the DVD 24 is displayed on the screen 4.

On the other hand, the voice data D2A given to the modulation circuit 25 of the wireless transmission transmitting circuit 23 from the DVD demodulation circuit 20 is compression-encoded by a Dolby AC3 system or a Digital Theater Systems (DTS) standardized by the DVD standards.

The modulation circuit 25 performs a predetermined digital modulating process in accordance with a predetermined infrared wireless transmission system to this compression-encoded voice data D2A. The modulation circuit 25 then applies the acquired modulation voice signal S1 with an infrared Light Emitting Diode (LED) 26, thereby flash-driving the infrared LED 26 based on the modulation voice signal S1. Thus, the infrared ray transmission signal S2 based on this modulation voice signal S1 is emitted toward the front speakers 11A to 11C, the subwoofer 12 and rear speakers 13A, 13B, respectively.

Incidentally, in the case of this embodiment, as the infrared wireless transmission system when the voice data is wirelessly transmitted via an infrared ray as described above, a protocol specified in an International Electrotechnical Commission (IEC)-61603-8-1 is used. The IEC-61603-8-1 is the standards for wirelessly transmitting 2-channel voice data via an infrared ray in related art. The transmission bandwidth is 2.5 MHz and a transmission rate at a full band mode is 3.072 Mb/sec. Accordingly, sufficient band and transmission rate can be assured to transmit the compression-encoded voice data. Further, the sub-carrier frequency is apart from the sub-carrier frequency used in the infrared systems such as an existing infrared remote controller, etc. Therefore, the compressed voice data can be transmitted without arising an interference with the transmission signal in these other infrared systems.

Figure 4:
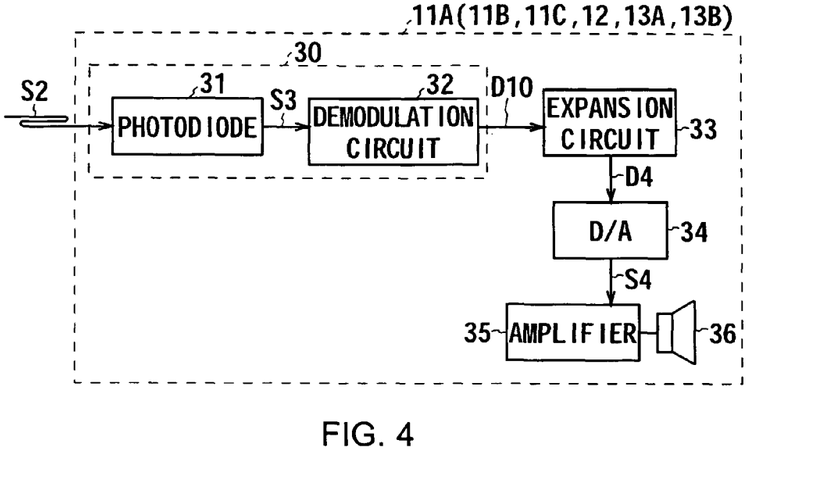
FIG. 4 is a block diagram showing simple configurations of each front speaker, a subwoofer and each rear speaker in the home theater system according to the first embodiment.

The front speakers 11A to 11C, the subwoofer 12 and the rear speakers 13A, 13B respectively have configurations as shown in FIG. 4. The infrared transmission signal S2 transmitted from the DVD reproducer 15 is received by the photodiode 31 of a wireless transmission receiving circuit 30. The photodiode 31 photoelectric-converts the received infrared transmission signal S2, and then sends the acquired modulation voice signal S3 to a demodulation circuit 32.

The demodulation circuit 32 performs a predetermined modulating process including an error correcting process to the supplied modulation voice signal S3, and then sends the acquired voice data D10 to an expansion circuit 33. The expansion circuit 33 performs a predetermined expanding process according to the Dolby AC3 system or the DTS system, etc., to the supplied voice data D10. Then, the expansion circuit 33 sends the voice data D4 of the self-corresponded channel from among the voice data D4 of the baseband of the acquired each channel to a digital/analog conversion circuit 34.

The digital/analog conversion circuit 34 performs digital-analog conversion of the supplied voice data D4; and sends the acquired voice signal S4 of analog waveform to a speaker unit 36 through an amplifier 35. Thus, a voice based on this voice signal is output from the speaker unit 36.

In this manner, in the home theater system 10, the video based on the video voice data D1 reproduced from the DVD 24 is projected onto the screen 4. In synchronization with this, the voices based on the video voice data D1 can be output from the front speakers 11A to 11C, the subwoofer 12 and rear speakers 13A, 13B, respectively.

In the home theater system 10 with the above-mentioned configuration, in the state that the voice data D2A reproduced from the DVD 24 by the DVD reproducer 15 installed near the projector 2 of the rear side is remain compression-encoded, and is wirelessly transmitted from the DVD reproducer 15 to the front speakers 11A to 11C, the subwoofer 12 and the rear speakers 13A, 13B. After such compression-encoded voice data D2A is expanded in the front speakers 11A to 11C, the subwoofer 12 and the rear speakers 13A, 13B, the voice based on the obtained voice data D2A is output to the front speakers 11A to 11C, the subwoofer 12 and the rear speakers 13A, 13B.

Therefore, the home theater system 10 does not require any wiring of the speaker cable from the DVD reproducer 15 to the front speakers 11A to 11C, the subwoofer 12 and the rear speakers 13A, 13B at all. Hence, the trouble of wiring such speaker cable is solved. In addition, the appearance after the installation is not ruined.

Further, in the home theater system 10, the voice data D2A remain compression-encoded is wirelessly transmitted as the voice data to the front speakers 11A to 11C, the subwoofer 12 and the rear speakers 13A, 13B. Thus, as compared with the case where the voice data D2A is transmitted after expansion, only a narrow band is required as the transmission band, and the coexistence with the existing other infrared systems is enabled.

In the home theater system 10, the installing place of the DVD reproducer 15 may be anywhere within the area in which the compression-encoded voice data D2A can be wirelessly transmitted to the front speakers 11A to 11C, the subwoofer 12 and the rear speakers 13A, 13B. The DVD reproducer 15 may also be placed at viewer's hand. That is, the DVD reproducer 15 may be reduced in size down to a portable size or its function may be contained in a notebook size personal computer. Then, the DVD reproducer 15 is normally cleared away in order not to be a hindrance and is connected to the projector 2 through the video cable 14 only at the time of use. Therefore, the full-scale home theater system 10 can be built.

With the configuration described above, the DVD reproducer 15 is installed near the projector 2 of the near side, and in the state that the voice data D2A reproduced from the DVD 24 by the DVD reproducer 15 remain compression-encoded, and is wirelessly transmitted from the DVD reproducer 15 to the front speakers 11A to 11C, the subwoofer 12 and the rear speakers 13A, 13B. Then, such compression-encoded voice data D2A is processed to be expanded in the front speakers 11A to 11C, the subwoofer 12 and the rear speakers 13A, 13B. Thus, the wiring of the speaker cable is not required at all and the trouble of wiring is solved. Further, the appearance after the installation is not ruined. In addition, since only a narrow band is required as the transmission band of the voice data D2A, the coexistence with the other infrared systems is enabled. In this manner, the home theater system which can provide the voice of high quality is realized while coexisting with the other wireless transmission systems.

(2) Second Embodiment

Figure 5:
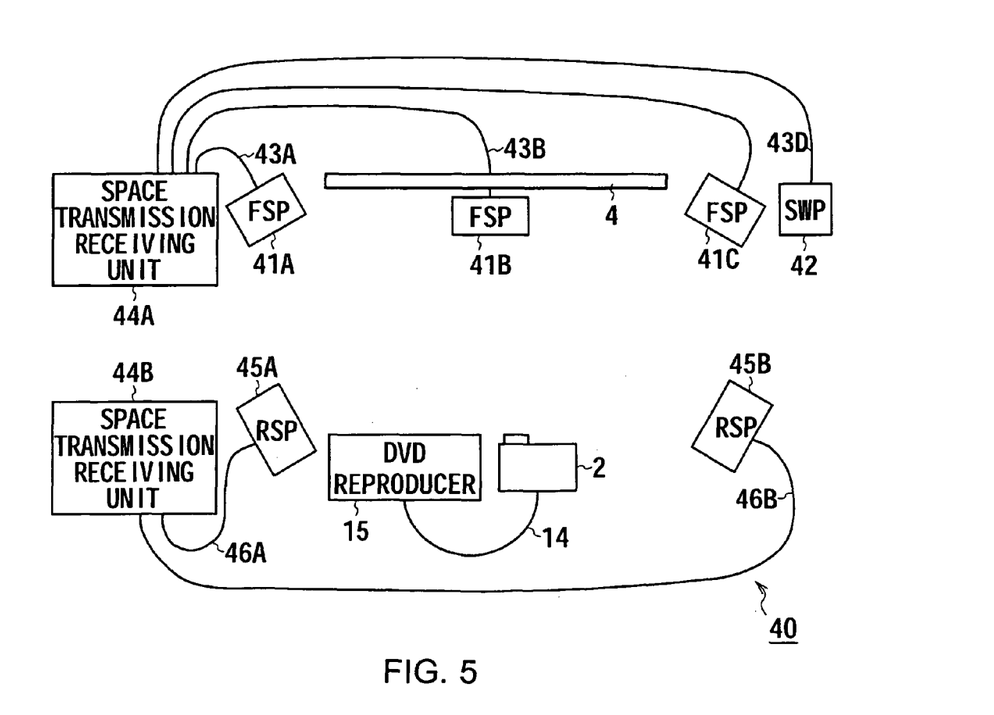
FIG. 5 is a schematic view showing the configuration of the home theater system according to a second embodiment.

FIG. 5, in which similar reference numerals indicate like parts in FIG. 2, shows a home theater system 40 according to a second embodiment. The home theater system 40 is configured similarly to the home theater system 10 of the first embodiment except for the following. The front speakers 41A to 41C and a subwoofer 42 are connected to a first amplifier-containing wireless transmission receiving unit 44A installed at the front side through speaker cables 43A to 43D. The rear speakers 45A, 45B are connected to a second amplifier-containing wireless transmission receiving unit 44B installed at the rear side through speaker cables 46A, 46B, and voice data is wirelessly transmitted from the DVD reproducer 15 toward the first and second amplifier-containing wireless transmission receiving units 44A, 44B.

In fact, in the case of the home theater system 40, as described above with reference to FIG. 3, the DVD reproducer 15 processes to expand the video data D2V of the video data DV2 (FIG. 3) and the voice data D2A (FIG. 3) extracted from the video voice data D1 (FIG. 3) reproduced from the charged DVD 24 (FIG. 3). Then, the DVD reproducer 15 transmits the expanded video data D2A to the projector 2 through the video cable 14. Further, the DVD reproducer 15 uses the infrared ray in the state that the voice data D2A remains compression-encoded and wirelessly transmits the compression-encoded voice data D2A to the first and second amplifier-containing wireless transmission receiving units 44A, 44B.

Figure 6:
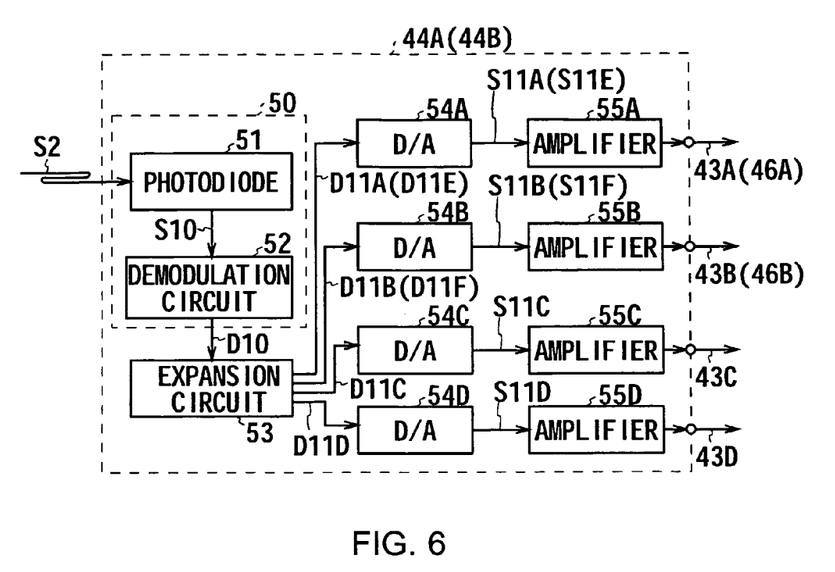
FIG. 6 is a block diagram showing the configurations of first and second amplifier-containing wireless transmission receiving units.

The first and second amplifier-containing wireless transmission receiving units 44A, 44B are configured as shown in FIG. 6. The infrared transmission signal S2 (FIG. 3) transmitted from the DVD reproducer 15 is received by the photodiode 51 of a wireless transmission receiving circuit 50. Then, the photodiode 51 photoelectric-converts the received infrared transmission signal S2 and sends the acquired modulation voice signal S10 to a demodulation circuit 52.

The demodulation circuit 52 performs a predetermined demodulating process including an error correcting process to the supplied modulation voice signal S10 and sends the acquired voice data D10 to an expansion circuit 53. Also, the expansion circuit 53 performs a predetermined expanding process to the supplied voice data D10. From among the voice data D11A to D11F of the baseband of the acquired each channel, the first amplifier-containing wireless transmission receiving unit 44A sends the voice data 11A to 11D of each channel for the front speakers 41A to 41C and the subwoofer 42 of the voice data D11A to D11F of each channel of thus obtained baseband to the corresponding first to fourth digital/analog conversion circuits 54A to 54D. The second amplifier-containing wireless transmission receiving unit 44B sends the voice data D11E, D11F of the channel for the rear speakers 45A, 45B to the first or second digital/analog conversion circuits 54A, 54B.

The first to fourth digital/analog conversion circuits 54A to 54D perform digital/analog conversion of the supplied voice data D11A to D11F and then send the acquired voice signals S11A to S11F of analog waveform to the corresponding front speakers 41A to 41C, subwoofer 42 or rear speakers 45A, 45B sequentially through amplifiers 55A to 55D and speaker cables 43A to 43D, 46A, and 46B. Thus, the voices based on these voice signals S11A to S11F are output from the front speakers 41A to 41C, subwoofer 42 or rear speakers 45A, 45B.

In this manner, in the home theater system 40 too, the video based on the video voice data D1 reproduced from the DVD 24 is projected onto the screen 4. In synchronization with this, the voices based on the video voice data D1 can be output from the front speakers 41A to 41C, subwoofer 42 and rear speakers 43A, 43B, respectively, without connecting between the front side and the rear side by a video cable or a speaker cable.

In the home theater system 40 with above-mentioned configuration, the voice data D2A reproduced from the DVD 24 is wirelessly transmitted from the DVD reproducer 15 to the first and second amplifier-containing wireless transmission receiving units 44A, 44B in the state that the voice data D2 remains compression-encoded. After such compression-encoded voice data S2 is processed to be expanded in the first and second amplifier-containing wireless transmission receiving units 44A, 44B, the acquired voice signals S11A to S11F of each channel are supplied to the corresponding front speakers 41A to 41C, subwoofer 42 and rear speakers 43A, 43B.

Therefore, the home theater system 40 can reduce the number of sets of the wireless transmission receiving circuit 50 and the expansion circuit 53, from six sets which are required in the home theater system 10 to two sets, while achieving an effect similar to the home theater system 10 (FIG. 2) according to the first embodiment. Accordingly, the configuration of the whole system can be simplified, and the system can be built at a low cost.

With the configuration described above, the voice data D2A reproduced from the DVD 24 is wirelessly transmitted from the DVD reproducer 15 to the first and second amplifier-containing wireless transmission receiving units 44A, 44B in the state that the voice data D2A remains compression-encoded. And, after such compression-encoded voice data D2A is processed to be expanded in the first and second amplifier-containing wireless transmission receiving units 44A, 44B, the acquired voice signals S11A to S11R of each channel are supplied to the corresponding front speakers 41A to 41C, subwoofer 42 and rear speakers 43A, 43B. Thus, in addition to the effect available by the home theater system 10 according to the first embodiment, the configuration of the whole system is simplified, and the home theater system which can be built at a low cost, can be realized.

(3) Third Embodiment

Figure 7:
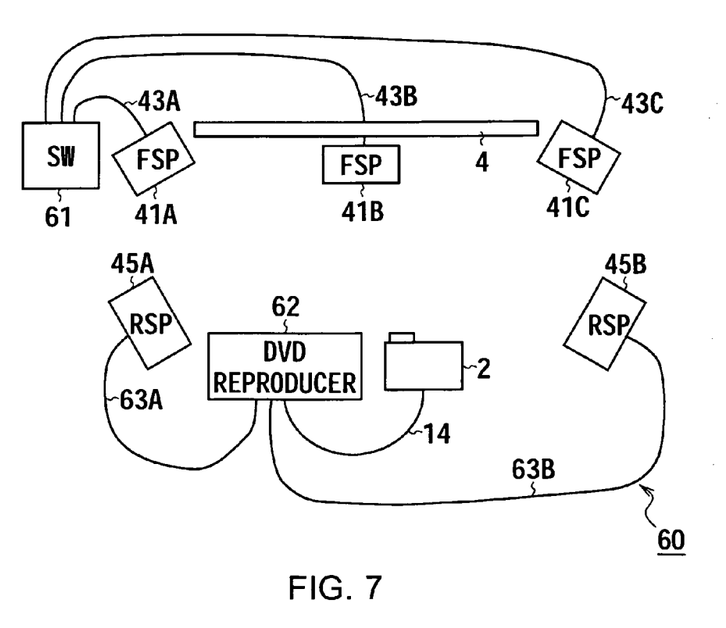
FIG. 7 is a schematic view showing the configuration of a home theater system according to a third embodiment.

FIG. 7, in which similar reference numerals indicate like parts in FIG. 5, shows a home theater system 60 according to a third embodiment. The home theater system 60 is configured similarly to the home theater system 40 (FIG. 5) of the second embodiment except for the following. The function of the first amplifier-containing wireless transmission receiving unit 44A (FIG. 5) in the second embodiment, is provided to a subwoofer 61. The processing function of expanding the voice data D2A in the second amplifier-containing wireless transmission receiving unit 44B (FIG. 5) is provided to the DVD reproducer 62. And, the DVD reproducer 62 and the rear speakers 45A, and 45B are connected therebetween through speaker cables 63A, 63B.

Figure 8:
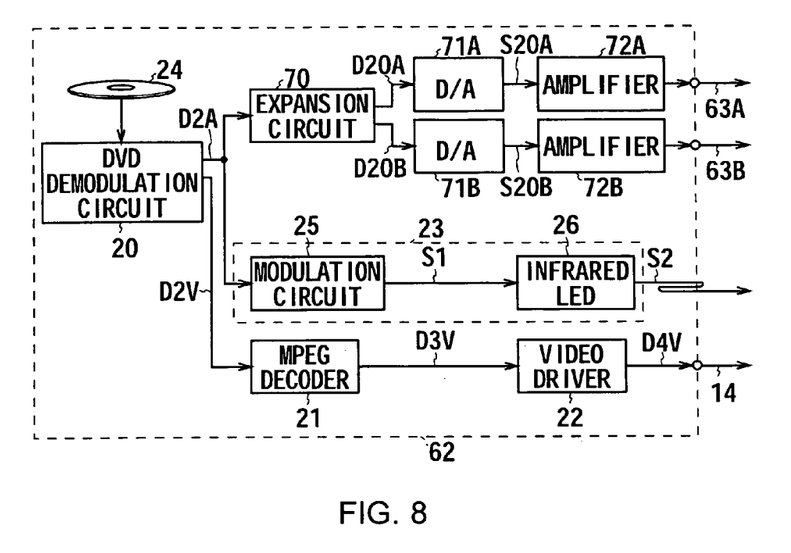
FIG. 8 is a block diagram showing a schematic configuration of a DVD reproducer in the home theater system according to the third embodiment.

Concretely, in the case of the home theater system 60, as shown in FIG. 8 in which the same reference numerals are attached to the corresponding parts in FIG. 3, the DVD reproducer 62 has a configuration that an expansion circuit 70, two digital/analog conversion circuits 71A, 71B and two amplifiers 72A, 72B are added to the DVD reproducer 15 (FIG. 3) according to the second embodiment.

The DVD reproducer 62 performs a predetermined expanding process in the expansion circuit 70 on voice data D2A which remains compression-encoded, acquired by a demodulating process to be output from the DVD demodulator circuit 20. The DVD reproducer 62 further sends the voice data D20A, D20B of each channel for the rear speakers 45A, 45B of the voice data of the baseband of thus acquired each channel to the corresponding first and second digital/analog conversion circuits 71A, 71B, respectively.

The first and second digital/analog conversion circuits 71A, 71B perform digital/analog conversion of the supplied voice data D20A, D20B, and then send the supplied voice signals S20A, S20B of analog waveform to the corresponding rear speaker units 45A, 45B sequentially through the corresponding first and second amplifiers 72A, 72B and speaker cables 63A, 63B. Thus, the voices based on these voice signals S20A, S20B are output from the rear speaker units 45A, 45B, respectively.

The DVD reproducer 62 wirelessly transmits the voice data D2A output from the DVD demodulation circuit 20 to a subwoofer 61 as the infrared ray transmission signal S2 through the wireless transmission transmitting circuit 23.

Figure 9:
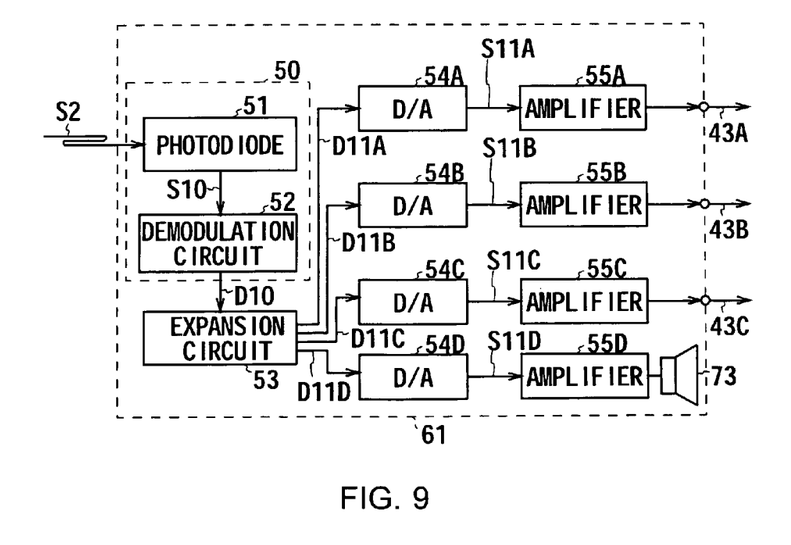
FIG. 9 is a block diagram showing a configuration of a subwoofer in the home theater system according to the third embodiment.

The subwoofer 61 is configured as shown in FIG. 9 in which the same reference numerals are attached to the corresponding parts in FIG. 6. In subwoofer 61, the infrared ray transmission signal S2 transmitted from the DVD reproducer 62 is received and demodulated in the wireless transmission receiving circuit 50. The acquired voice data D10 of each channel is processed to be expanded in the expansion circuit 53. Then, the voice data D11A to D11C of each channel for the front speakers 41A to 41C are transmitted to the first to third digital/analog conversion circuits 54A to 54C, respectively.

Thus, the first to third digital/analog conversion circuits 54A to 54C perform digital/analog conversion of the supplied voice data D11A to D11C and then send the acquired voice signals S11A to S11C of analog waveform to the corresponding front speakers 41A to 41C sequentially through the amplifiers 55A to 55C and the speaker cables 43A to 43C. Thus, the voices based on these voice signals S11A to S11C are output from the front speakers 41A to 41C, respectively.

Furthermore, the subwoofer 61 applies the voice data D11D of the channel for the subwoofer 61 expanded in the expansion circuit 53 to the fourth digital/analog conversion circuit 54D. The fourth digital/analog conversion circuit 54D performs the digital/analog conversion of the supplied voice data D11D and applies the acquired voice signal S11D of analog waveform to a subwoofer unit 73 contained in the housing of the subwoofer 61 through the amplifier 55D. Thus, the voice based on the voice signal S11D is output from the subwoofer unit 73.

In this manner, in the home theater system 60 too, the video based on the video voice data D1 reproduced from the DVD 24 is projected onto the screen 4. In synchronization with this, the voices based on the video voice data D1 can be output from the front speakers 41A to 41C, the subwoofer 61 and the rear speakers 45A, 45B, respectively, without connecting between the front side and the rear side by a video cable or a speaker cable.

In the home theater system 60 with above configuration, the voice data D2A reproduced from the DVD 24 in the DVD reproducer 62 installed near the rear side projector 2 is wirelessly transmitted from the DVD reproducer 62 to the subwoofer 61 in the state that the voice data D2A remains compression-encoded. After such compression-encoded voice data D2A is expanded and digital/analog converted, the voice signals S11A to S11C of the channel for the acquired front speakers 41A to 41C are supplied to the corresponding front speakers 41A to 41C. On the one hand, the voice signal S11D of the channel for the acquired subwoofer 61 is supplied to the subwoofer unit 73 in the subwoofer 61. Moreover, the voice data D20A, D20B of the channel for the rear speakers 45A, 45B reproduced from the DVD 24 in the DVD reproducer 62 are expanded and analog/digital converted in the DVD reproducer 62. Then, the voice data D20A, D20B are transmitted to the corresponding rear speakers 45A, 45B through the speaker cables 63A, 63B.

Therefore, in the home theater system 60, as well as the home theater system 40 (FIG. 5) according to the second embodiment, while preventing the video cable and the speaker cable from being drawn between the front side and the rear side, the number of the units of the whole system can be reduced since the parts corresponding to the first and second amplifier-containing wireless transmission receiving units 44A, 44B are omitted. Therefore, the system configuration can be simplified, and the system can be build at a low cost.

Furthermore, as clearly seen in FIG. 5 and FIG. 7, in this home theater system 60, as compared with the home theater system 40 according to the second embodiment, the amount of wiring of the speaker cable is reduced. Therefore, the trouble of wiring at the time of installation can be reduced.

With the configuration described above, the function of the first amplifier-containing wireless transmission receiving unit 44A is provided to the subwoofer 61, and the function of the second amplifier-containing wireless transmission receiving unit 44B is provided to the DVD reproducer 62. Thus, the number of the units of the whole system can be reduced while preventing the video cable and the speaker cable from being drawn between the front side and the rear side, similarly to the home theater system 40 according to the second embodiment. Thus, the configuration of the whole system is further simplified and the home theater system which can be built at a low cost can be realized.

(4) Fourth Embodiment

Figure 10:
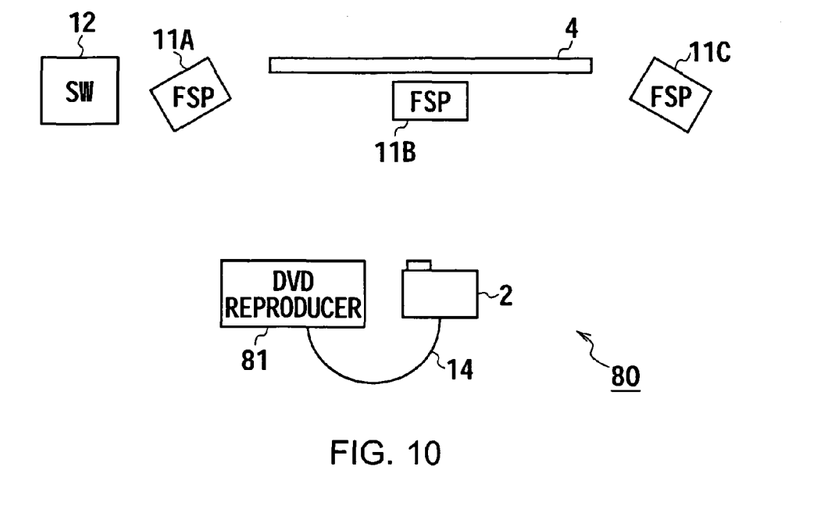
FIG. 10 is a schematic view showing a configuration of a home theater system according to a fourth embodiment.

FIG. 10, in which similar reference numerals indicate like parts in FIG. 2, shows a home theater system 80 according to a fourth embodiment. This home theater system 80 is configured similarly to the home theater system 10 of the first embodiment except for the following. The configuration of the DVD reproducer 81 is different. And, the rear speakers 13A, 13B (FIG. 2) are omitted.

Figure 11:
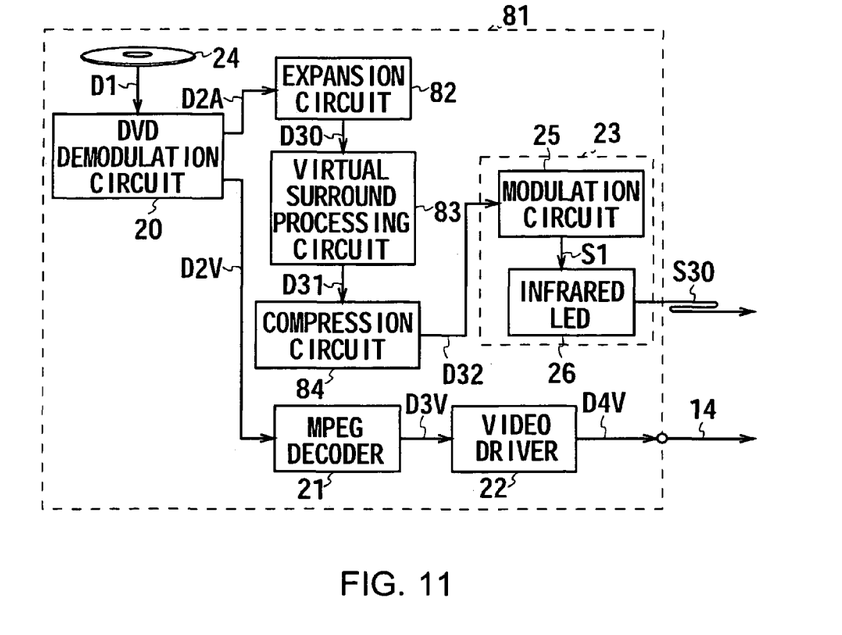
FIG. 11 is a block diagram showing a simple configuration of a DVD reproducer in the home theater system according to the fourth embodiment.

Concretely, as shown in FIG. 11 in which the same reference numerals are attached to the corresponding parts in FIG. 3, the DVD reproducer 81 has a configuration that an expansion circuit 82, a virtual surround processing circuit 83, and a compression circuit 84 are added between the DVD demodulation circuit 20 and the wireless transmission transmitting circuit 23 with respect to the DVD reproducer 15 (FIG. 3) according to the first embodiment.

In the DVD reproducer 81, the demodulated voice data D2A output from the DVD demodulation circuit 20 is expanded in the expansion circuit 82. Then, the acquired voice data D30 of the baseband is sent to a virtual surround processing circuit 83.

The virtual surround processing circuit 83 performs a predetermined virtual surround process for generating an acoustic effect of these virtual surround to other voice data D30 except the voice data D30 of the channel for the rear speakers 13A, 13B (FIG. 2) of the supplied voice data of each channel. Then, the acquired virtual surround process voice data D31 of the channel is sent to a compression circuit 84.

The compression circuit 84 performs compression encoding by the same compression encoding system as the voice data D2A before the supplied each virtual surround processing voice data D31 is expanded in the expansion circuit 82. Then, the acquired compression-encoded voice data D32 is sent to the wireless transmission transmitting circuit 23.

As a result, this voice data D32 is wirelessly transmitted to the respective front speakers 11A to 11C and the subwoofer 12 as the infrared ray transmission signal S30 through the wireless transmission transmitting circuit 23. The voice data D32 is then expanded in the front speakers 11A to 11C and the subwoofer 12. Then, the voices based on the acquired voice data are output from the front speakers 11A to 11C and the subwoofer 12.

In this manner, in the home theater system 80, the video based on the video voice data D1 reproduced from the DVD 24 is projected on the screen 4. In synchronization with this, the voice processed by the virtual surround can be output from the front speakers 11A to 11C and the subwoofer 12.

The home theater system 80 with the above configuration sequentially performs the expanding process, the virtual surround process and the compression encoding process to the voice data D2A reproduced from the DVD 24. The acquired compression-encoded voice data D32 is wirelessly transmitted from the DVD reproducer 81 to the front speakers 11A to 11C and the subwoofer 12. On the other hand, in the front speakers 11A to 11C and the subwoofer 12, the compression-encoded voice data D32 is expanded and the voice based on the acquired voice data is output from the front speakers 11A to 11C and the subwoofer 12, respectively.

Therefore, in the home theater system 80, in addition to the effect obtained by the first embodiment, the rear speakers 13A, 13B can be omitted. The configuration of the whole system is further simplified, and the system can be built at a low cost.

With the configuration described above, the voice data D2A reproduced from the DVD 24 is sequentially applied with the expanding process, the virtual surround process and the compression encoding process. The acquired compression-encoded voice data D32 is wirelessly transmitted from the DVD reproducer 81 to the front speakers 11A to 11C and the subwoofer 12. On the other hand, in the front speakers 11A to 11C and the subwoofer 12, the voice data D32 is expanded and the voice based on the acquired voice data is output from the front speakers 11A to 11C or the subwoofer 12. In this manner, the configuration of the whole system is further simplified and the home theater system which can be built at a low cost, can be realized.

(5) Other Embodiments

In the above-mentioned first to fourth embodiments, the cases that the present invention is applied to the home theater systems 10, 40, 60 and 80 have been described. However, the present invention is not limited to these embodiments, but can be applied widely to other various voice output systems.

Furthermore, in the above-mentioned first to fourth embodiments, the following cases have been described. The DVD reproducers 15, 62, and 81 disposed at the side opposed to the video display surface are applied as a transmitting means for acquiring compression-encoded voice data attached to the video displayed on the video display surface, and for wirelessly transmitting the voice data. And, such compression-encoded voice data is reproduced and acquired from the DVD 24. However, the present invention is not limited thereto. For example, a tuner for receiving the television broadcasting may be applied as the transmitting means to acquire the compression-encoded voice data by receiving the television broadcasting. Also, the compression-encoded voice data may be acquired by compression-encoding the voice data of the baseband.

Further, in the above-mentioned first to fourth embodiments, the case that the compression-encoded voice data is wirelessly transmitted by using infrared rays has been described. However, the present invention is not limited thereto. Alternatively, the wireless transmission can be performed by using radio waves and the like other than infrared rays.

Moreover, in the above-mentioned third embodiment, the following case has been described. The function of the first amplifier-containing wireless transmission receiving unit 44A (FIG. 5) in the second embodiment is provided to the subwoofer 61. And, the expansion processing function of the voice data D2A in the second amplifier-containing wireless transmission receiving unit 44B (FIG. 5) is provided to the DVD reproducer 62. However, the present invention is not limited thereto. Alternatively, these functions may be provided to any of the front speakers 41A to 41C and/or the rear speakers 45A, 45B.

The present invention can be widely applied to various voice output systems in addition to the home theater system.

It should be understood by those skilled in the art that various modifications, combinations, sub-combinations and alterations may occur depending on design requirements and other factors insofar as they are within the scope of the appended claims or the equivalents thereof.

The invention claimed is:

1. A voice output system, comprising:
    video output means for displaying a video on a video display surface;
    voice output means separate from the video output means; and
    wireless transmitting means, disposed at a side opposed to the video display surface, for acquiring compression-encoded voice data accompanying a video displayed on the video display surface, for performing a modulation process in accordance with a predetermined infrared wireless transmission system on the compression-encoded voice data to obtain modulated voice data, and for wirelessly transmitting the modulated voice data to the voice output means by way of an infrared ray having a sub-carrier frequency that is different from a sub-carrier frequency used for a remote controller;
    said voice output means being disposed on the video display surface side for receiving the infrared ray wirelessly transmitted from the wireless transmitting means, expanding the voice data therein, and outputting the voice based on the acquired expanded voice data,
    wherein the wireless transmitting means includes:
        virtual surround processing means for performing a predetermined virtual surround process on the acquired voice data to generate a virtual surround acoustic effect without said voice output means being disposed on the side opposed to the video display surface.

2. The voice output system according to claim 1, wherein:
    the voice output means includes one or a plurality of speakers; and
    the speaker includes
        receiving means for receiving the voice data wirelessly transmitted from the transmitting means,
        expanding means for expanding the voice data received by the receiving means,
        digital/analog conversion means for digital/analog converting the expanded voice data, and
        a speaker unit for outputting the voice based on the voice signal acquired by digital/analog converting the voice data.

3. The voice output system according to claim 1, wherein the voice output means includes:
    receiving means for receiving the infrared ray wirelessly transmitted from the wireless transmitting means, for expanding the voice data therein, and for digital/analog converting the voice data; and
    one or a plurality of speakers connected to the receiving means through a cable to output the voice based on the digital/analog converted voice data transmitted from the receiving means through the cable.

4. The voice output system according to claim 3, wherein the receiving means is a speaker.

5. The voice output system according to claim 1, wherein the wireless transmitting means expands the acquired compression-encoded voice data, performs a predetermined signal processing to the expanded voice data, and then compression encodes the voice data.

6. The voice output system according to claim 1, wherein the predetermined infrared wireless transmission system corresponds a protocol of International Electrotechnical Commission (IEC) 61603-8-1.

7. A voice output method, comprising:
    displaying, using a video output unit, a video on a video display surface;
    acquiring compression-encoded voice data accompanying a video displayed on the video display surface at a side opposed to the video display surface;
    performing a modulation process in accordance with a predetermined infrared wireless transmission system on the compression-encoded voice data to obtain modulated voice data;
    wirelessly transmitting the modulated voice data to a voice output unit separate from the video output unit by way of an infrared ray having a sub-carrier frequency that is different from a sub-carrier frequency used for a remote controller; and
    receiving, at the voice output unit, the wirelessly transmitted infrared ray and expanding, at the voice output unit, the voice data therein at least at the video display surface side and outputting the voice based on the acquired expanded voice data,
    wherein the wirelessly transmitting step includes:
        performing a predetermined virtual surround process on the acquired voice data to generate a virtual surround acoustic effect without outputting the voice on the side opposed to the video display surface.

8. The voice output method according to claim 7, wherein: the acquiring step includes wirelessly transmitting the modulated voice data to one or a plurality of speakers disposed at the video display surface side; and the receiving and expanding steps include receiving and expanding the wirelessly transmitted voice data at the speaker and outputting the voice based on the acquired expanded voice data from the speaker.

9. The voice output method according to claim 7, wherein the receiving and expanding steps includes:
  receiving the wirelessly transmitted infrared ray, and expanding the wirelessly transmitted voice data therein using receiving means disposed at the video display surface side, and digital/analog converting the voice data; and
  transmitting the acquired digital/analog converted voice data from the receiving means to the one or the plurality of speakers connected to the receiving means through a cable.

10. The voice output method according to claim 9, wherein the receiving means is a speaker.

11. The voice output method according to claim 7, wherein the acquiring step includes expanding the acquired compression-encoded voice data, performing a predetermined signal processing to the expanded voice data, and then compression encoding the voice data.

12. The voice output method according to claim 7, wherein the predetermined infrared wireless transmission system corresponds a protocol of International Electrotechnical Commission (IEC) 61603-8-1.

13. A voice output system, comprising:
  a video output unit that displays a video on a video display surface;
  a voice output unit separate from the video output unit; and
  a wireless transmitting unit disposed at a side opposed to the video display surface to acquire compression-encoded voice data accompanying a video displayed on the video display surface, to perform a modulation process in accordance with a predetermined infrared wireless transmission system on the compression-encoded voice data to obtain modulated voice data, and to wirelessly transmit the modulated voice data to the voice output unit by way of an infrared ray having a sub-carrier frequency that is different from a sub-carrier frequency used for a remote controller;
  said voice output unit being disposed at least on the video display surface side to receive the infrared ray wirelessly transmitted from the wireless transmitting means, to expand the voice data wirelessly transmitted from the wireless transmitting unit, and to output the voice based on the acquired expanded voice data,
  wherein the wireless transmitting unit includes:
  a virtual surround processing unit to performing a predetermined virtual surround process on the acquired voice data to generate a virtual surround acoustic effect without said voice output unit being disposed on the side opposed to the video display surface.

14. The voice output system according to claim 13, wherein the predetermined infrared wireless transmission system corresponds a protocol of International Electrotechnical Commission (IEC) 61603-8-1.

* * * * *